United States Patent
Sumaki et al.

(10) Patent No.: US 9,561,440 B2
(45) Date of Patent: Feb. 7, 2017

(54) GAMING DEVICE IMPLEMENTING A COOPERATIVE BATTLE GAME IN WHICH THE QUANTITY OF PLAYERS OF A GROUP OF PLAYERS ARE MANAGED BASED ON MISSION SUCCESS RATES

(71) Applicant: DeNA Co., Ltd., Tokyo (JP)

(72) Inventors: Yusuke Sumaki, Tokyo (JP); Kazuki Nakatani, Tokyo (JP); Mamoru Murakami, Tokyo (JP); Yutaka Muto, Tokyo (JP); Masaki Arizuka, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 213 days.

(21) Appl. No.: 14/242,618

(22) Filed: Apr. 1, 2014

(65) Prior Publication Data

US 2015/0105161 A1 Apr. 16, 2015

(30) Foreign Application Priority Data

Oct. 10, 2013 (JP) .................................. 2013-212630

(51) Int. Cl.
*A63F 13/35* (2014.01)
*A63F 13/795* (2014.01)
*A63F 13/67* (2014.01)
*A63F 13/822* (2014.01)

(52) U.S. Cl.
CPC .............. *A63F 13/35* (2014.09); *A63F 13/67* (2014.09); *A63F 13/795* (2014.09); *A63F 13/822* (2014.09)

(58) Field of Classification Search
None
See application file for complete search history.

(56) References Cited

U.S. PATENT DOCUMENTS

2010/0227691 A1* 9/2010 Karsten .................. G07F 17/32
463/42

FOREIGN PATENT DOCUMENTS

JP 2003-135854 A 5/2003

* cited by examiner

*Primary Examiner* — Milap Shah
*Assistant Examiner* — Robert T Clarke, Jr.
(74) *Attorney, Agent, or Firm* — Procopio, Cory, Hargreaves & Savitch LLP

(57) ABSTRACT

A server device according to the present invention, which is connected to a plurality of player terminals through a network, includes a storage unit configured to store an initial upper limit of number of groups and an initial threshold value smaller than an upper limit of a group affiliation rate, which is a ratio of number of affiliated persons with respect to a quota of a group, a group generating portion configured to generate a plurality of groups to which the group affiliation rate of the initial threshold value is set, at a start of a game, based on the initial upper limit of the number of groups, and a player distributing portion configured to distribute players to groups.

5 Claims, 13 Drawing Sheets

FIG. 4

| CHARACTER ID | CHARACTER NAME | RARITY | INITIAL ATTACK STRENGTH | INITIAL DEFENSE STRENGTH | INITIAL HIT POINT |
|---|---|---|---|---|---|
| 0001 | CHARACTER A | COMMON | 15 | 8 | 10 |
| 0002 | CHARACTER B | UNCOMMON | 30 | 20 | 15 |
| 0003 | CHARACTER C | RARE | 45 | 30 | 25 |
| 0004 | CHARACTER D | SUPER RARE | 60 | 55 | 60 |
| ... | ... | ... | ... | ... | ... |

FIG. 5

| PLAYER ID | PLAYER NAME | POSSESSED CHARACTER INFORMATION |
|---|---|---|
| 0001 | PLAYER A | POSSESSED CHARACTER INFORMATION (1) |
| 0002 | PLAYER B | POSSESSED CHARACTER INFORMATION (2) |
| 0003 | PLAYER C | POSSESSED CHARACTER INFORMATION (3) |
| 0004 | PLAYER D | POSSESSED CHARACTER INFORMATION (4) |
| 0005 | PLAYER E | POSSESSED CHARACTER INFORMATION (5) |
| 0006 | PLAYER F | POSSESSED CHARACTER INFORMATION (6) |
| . | . | . |
| . | . | . |
| . | . | . |

FIG. 6

POSSESSED CHARACTER INFORMATION (3)
POSSESSED CHARACTER INFORMATION (2)
POSSESSED CHARACTER INFORMATION (1)

| CHARACTER ID | LEVEL | ATTACK STRENGTH | DEFENSE STRENGTH | HIT POINT | ACQUISITION DATE AND TIME | OWN TIME |
|---|---|---|---|---|---|---|
| 0011 | LV. 3 | 15 | 10 | 200 | 2012/2/13 10:00 | 0:00 |
| 0211 | LV. 4 | 20 | 23 | 150 | 2012/2/13 12:00 | 2:00 |
| 0133 | LV. 1 | 70 | 45 | 100 | 2012/2/14 11:30 | 1:30 |
| 0201 | LV. 4 | 22 | 40 | 600 | 2012/2/15 18:00 | 8:00 |
| 0072 | LV. 7 | 60 | 50 | 250 | 2012/2/16 13:30 | 3:30 |
| 0094 | LV. 1 | 300 | 200 | 450 | 2012/2/16 19:00 | 9:00 |
| . . . | . . . | . . . | . . . | . . . | | |

FIG. 7

| INDEX i | FIELD NAME (FIELD Fi) | MAXIMUM CAPACITY | CAPACITY | CAPACITY RATE | PLAYER ID |
|---|---|---|---|---|---|
| i = 1 | FIELD F1 | 100 | 50 | 50% | 0010.0015··· |
| i = 2 | FIELD F2 | 100 | 50 | 50% | 0008.0124··· |
| ⋮ | ⋮ | ⋮ | ⋮ | ⋮ | ⋮ |
| i = 9 | FIELD F9 | 100 | 49 | 49% | 0211.0017··· |
| i = 10 | FIELD F10 | 100 | 49 | 49% | 0092.0691··· |

| DATA ACQUISITION DATE AND TIME | BATTLE INFORMATION | MISSION SUCCESS RATE |
|---|---|---|
| 2013-09-11-18 | BATTLE INFORMATION (1) | 65% |
| 2013-09-11-19 | BATTLE INFORMATION (2) | 75% |
| 2013-09-11-20 | BATTLE INFORMATION (3) | 70% |
| ⋮ | ⋮ | ⋮ |

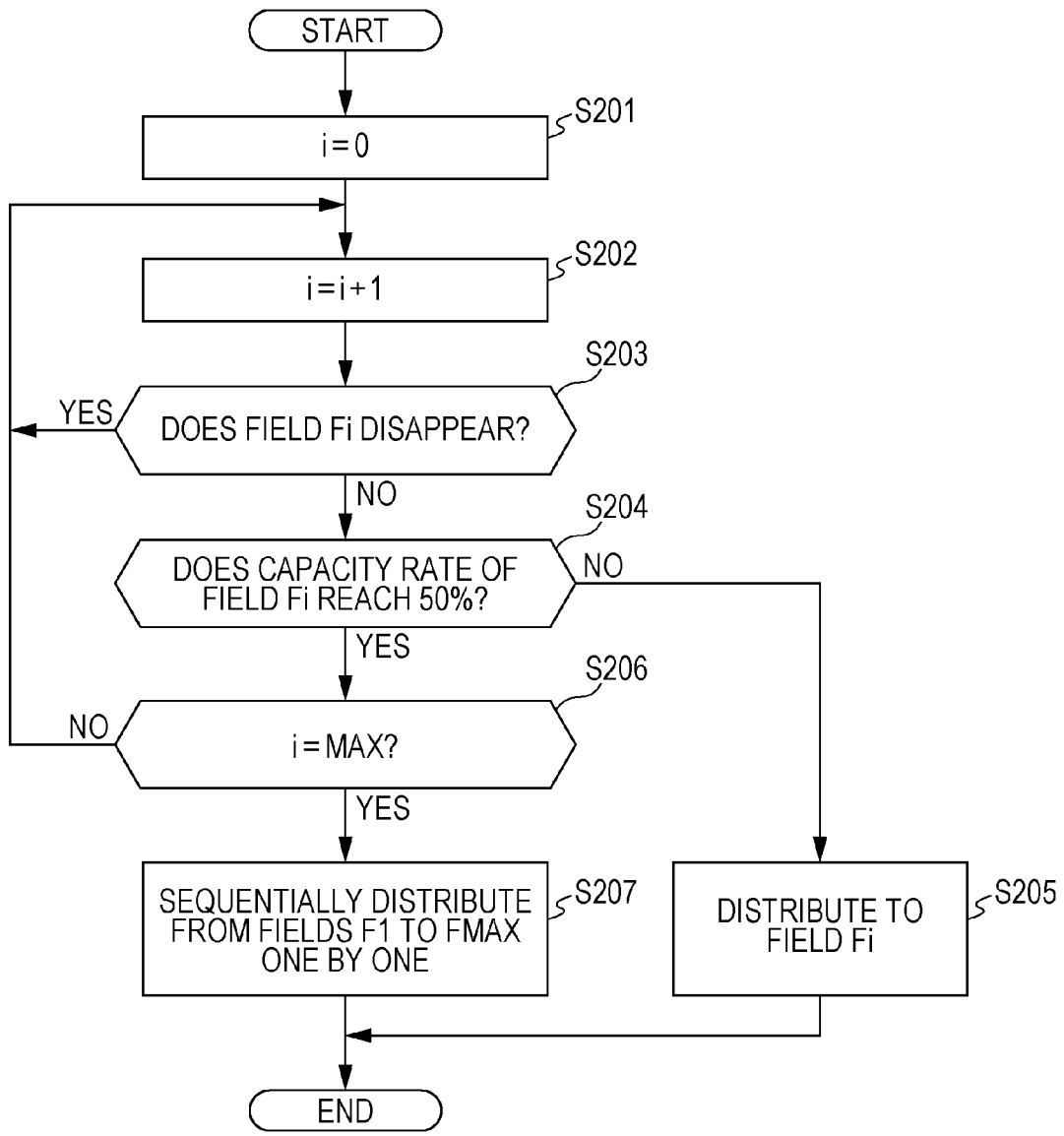

GAMING DEVICE IMPLEMENTING A COOPERATIVE BATTLE GAME IN WHICH THE QUANTITY OF PLAYERS OF A GROUP OF PLAYERS ARE MANAGED BASED ON MISSION SUCCESS RATES

BACKGROUND OF THE INVENTION

Field of the Invention

The present invention relates to a server device and a program.

Description of Related Art

There is known a server device, which is connected to a plurality of player terminals through a network, performs grouping according to a level of an entered player after previously receiving entries from the player terminals, and performs a battle game in the grouped group (for example, JP 2003-135854 A).

SUMMARY OF THE INVENTION

Therefore, when a player having performed an entry before a start of a game is distributed to any one group, the number of game participants can be grasped in advance.

In this regard, when a player having accessed the server at an arbitrary timing after the start of the game without performing the entry in advance is distributed to any one group, the number of accesses cannot be predicted. Therefore, the number of participants cannot be grasped in advance. Therefore, players are distributed to certain groups in accessed order, and when certain groups have reached the quota, a next group is generated and a player is distributed thereto.

However, if the players are distributed by such a procedure, the group reaches the quota quickly. Therefore, the larger the number of persons of the group is, the easier a mission is achieved. Consequently, there is a risk of lowering a game difficulty level.

The present invention has been made in consideration of such circumstances, and is directed to adjust a game difficulty level of each group with good balance by appropriately controlling the number of persons of each group.

A main invention of the present invention for solving the above problems is a server device, which is connected to a plurality of player terminals through a network, including: a storage unit configured to store an initial upper limit of number of groups and an initial threshold value smaller than an upper limit of a group affiliation rate, which is a ratio of number of affiliated persons with respect to a quota of a group; a group generating portion configured to generate a plurality of groups to which the group affiliation rate of the initial threshold value is set, at a start of a game, based on the initial upper limit of the number of groups; and a player distributing portion configured to, when there is a request for participation in a group from the player terminal after the start of the game, distribute players using the player terminals to groups where the group affiliation rate has not reach the initial threshold value, until the group affiliation rate of all groups reaches the initial threshold value, and, after the group affiliation rate of all groups has reached the initial threshold value, distribute players using the player terminals to groups where the group affiliation rate has not reached the upper limit.

Other features of the present invention will be apparent from the description of the present specification and the appended drawings.

According to the present invention, a game difficulty level of each group can be adjusted with good balance by appropriately controlling the number of persons of each group.

BRIEF DESCRIPTION OF THE DRAWINGS

FIG. 4 is a diagram illustrating an example of a data structure of character information;

FIG. 5 is a diagram illustrating an example of a data structure of player information;

FIG. 6 is a diagram illustrating an example of a data structure of possessed character information;

FIG. 7 is a diagram illustrating an example of a data structure of field information;

FIG. 14 is a flowchart for explaining a player distribution process.

DETAILED DESCRIPTION OF THE INVENTION

Figure 1:
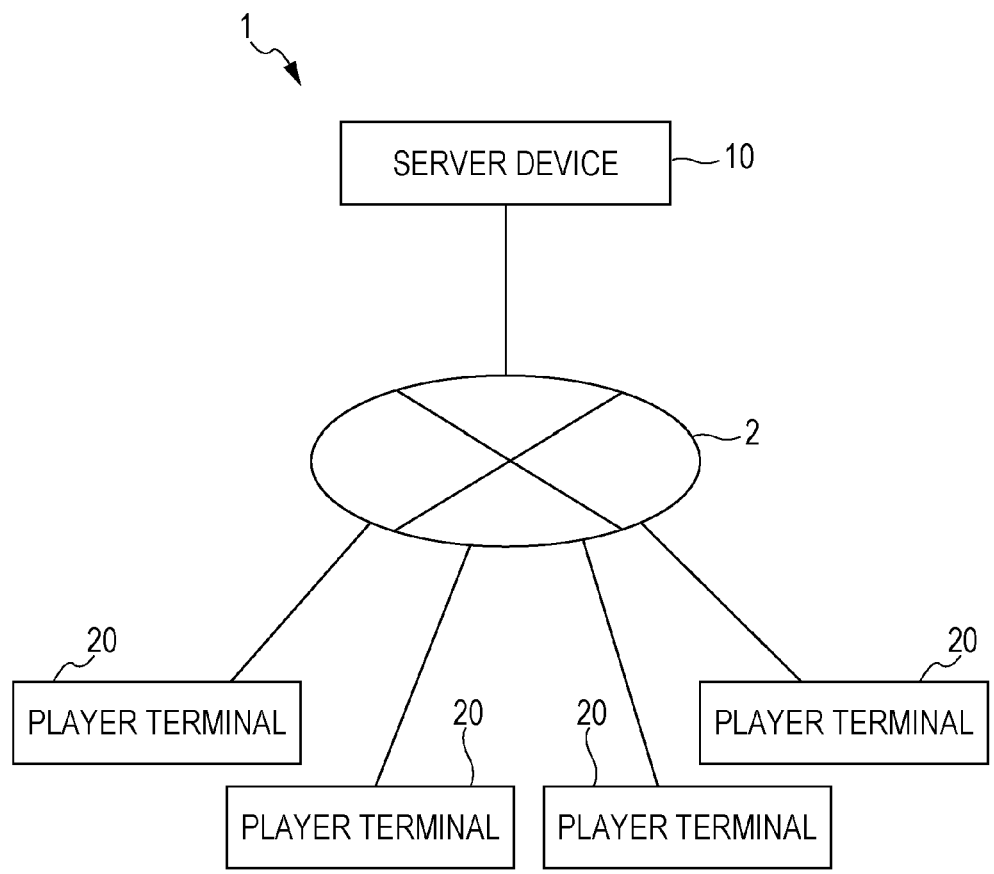
FIG. 1 is a diagram illustrating an overall configuration example of a game system.

At least the following matters will be apparent according to the description of the present specification and the appended drawings:

That is, a server device, which is connected to a plurality of player terminals through a network, includes: a storage unit configured to store an initial upper limit of number of groups and an initial threshold value smaller than an upper limit of a group affiliation rate, which is a ratio of number of affiliated persons with respect to a quota of a group; a group generating portion configured to generate a plurality of groups to which the group affiliation rate of the initial threshold value is set, at a start of a game, based on the initial upper limit of the number of groups; and a player distributing portion configured to, when there is a request for participation in a group from the player terminal after the start of the game, distribute players using the player terminals to groups where the group affiliation rate has not reach the initial threshold value, until the group affiliation rate of all groups reaches the initial threshold value, and, after the group affiliation rate of all groups has reached the initial threshold value, distribute players using the player terminals to groups where the group affiliation rate has not reached the upper limit.

According to such a server device, even when there is a request for participation in the group from the player after the start of the game, the game difficulty level of each group can be adjusted with good balance by appropriately controlling the number of persons of each group.

Also, in such a server device, the server device may include: an upper limit changing portion configured to change the upper limit of the number of the groups from the initial upper limit after the group affiliation rate of all groups has reached the upper limit; and an additional group generating portion configured to additionally generate a new group, based on the changed upper limit of the number of the groups, wherein after the group affiliation rate of all groups has reached the upper limit, the player distributing portion may distribute players using the player terminals to the newly added and generated group. According to such a server device, even when the group affiliation rate of all groups has reached the upper limit, the game difficulty level of each group can be adjusted with good balance by appropriately controlling the number of persons of each group Also, the server device may include: a game processing portion configured to progress a game that gives missions set by group units to each player belonging to each group in each of the plurality of groups; a calculating portion configured to calculate a mission success rate in all groups; and a threshold value changing portion configured to change the threshold value of the group affiliation rate from the initial threshold value, based on the calculated success rate, wherein the group additionally generating portion may additionally generate a new group where the group affiliation rate of the changed threshold value is set. According to such a server device, the number of persons of each group can be appropriately controlled according to the mission success rate.

Also, in such a server device, the storage unit may store an initial quota of a group, and include: a game processing portion configured to progress a game that gives missions set by group units to each player belonging to each group in each of the plurality of groups; a calculating portion configured to calculate a mission success rate in all groups; and a quota changing portion configured to change a quota of a group from the initial quota, based on the calculated success rate, wherein the group additionally generating portion additionally generates a new group where the changed quota is set.

According to such a server device, the number of persons of each group can be appropriately controlled according to the mission success rate.

Also, in such a server device, the game processing portion may change a difficulty level of the missions set by group units, based on the success rate calculated by the calculating portion.

According to such a server device, the game balance between the groups can be controlled according to the mission success rate.

Next, a non-transitory computer-readable storage medium stores game program causing a server device, which is connected to a plurality of player terminals through a network, to execute: storing an initial upper limit of number of groups and an initial threshold value smaller than an upper limit of a group affiliation rate, which is a ratio of number of affiliated persons with respect to a quota of a group; generating a plurality of groups to which the group affiliation rate of the initial threshold value is set, at a start of a game, based on the initial upper limit of the number of groups; and when there is a request for participation in a group from the player terminal after the start of the game, distributing players using the player terminals to groups where the group affiliation rate has not reach the initial threshold value, until the group affiliation rate of all groups reaches the initial threshold value, and, after the group affiliation rate of all groups has reached the initial threshold value, distributing players using the player terminals to groups where the group affiliation rate has not reached the upper limit.

According to such a non-transitory computer-readable storage medium storing the game program, the game difficulty level of each group can be adjusted with good balance by appropriately controlling the number of persons of each group Embodiments Configuration of Game System 1

FIG. 1 is a diagram illustrating an example of an overall configuration of a game system 1 according to the present embodiment. The game system 1 is configured to provide various game-related services to players through a network 2 (for example, the Internet or the like) and is configured to include a server device 10 and a plurality of player terminals 20.

<<Configuration of Server Device 10>>

Figure 2:
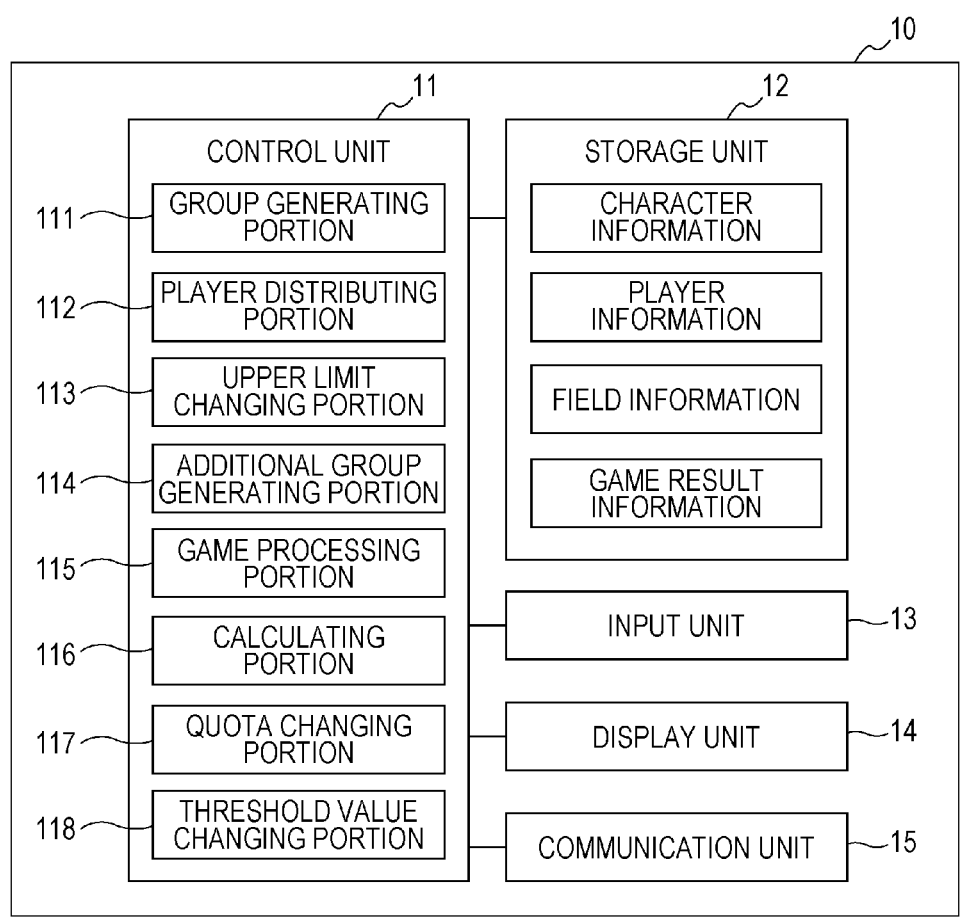
FIG. 2 is a block diagram illustrating a functional configuration of a server device.

FIG. 2 is a block diagram illustrating a functional configuration of the server device 10 according to the present embodiment. The server device 10 is an information processing device (for example, workstation or personal computer) used when a system administrator or the like operates and manages a game service. When receiving various commands (requests) from the player terminals 20, the server device 10 can deliver (respond) a game program operable on the player terminals 20 or a web page (game image or the like) created with a markup language (HTML or the like) in accordance with the specification of the player terminals 20. The server device 10 includes a control unit 11, a data storage unit 12, an input unit 13, a display unit 14, and a communication unit 15.

The control unit 11 transfers data between the respective units and controls the entire server device 10. The control unit 11 is realized in a manner that a central processing unit (CPU) executes a program stored in a predetermined memory. The control unit 11 of the present embodiment includes a group generating portion 111, a player distributing portion 112, an upper limit changing portion 113, an additional group generating portion 114, a game processing portion 115, a calculating portion 116, a quota changing portion 117, and a threshold value changing portion 118.

The group generating portion 111 has a function of executing a process of generating a group based on an initial condition at the start of the game. At the start of the game, the group generating portion 111 of the present embodiment generates a plurality of groups to which a group affiliation rate of an initial threshold value is set, based on an initial upper limit of the number of groups.

The player distributing portion 112 has a function of executing a process of making the players belong to the groups. When a request for participation in a group is received from the player terminal 20 after the start of the game, the player distributing portion 112 according to the present embodiment distributes a player using the corresponding player terminal to one of the plurality of groups.

The upper limit changing portion 113 has a function of executing a process of changing the upper limit of the number of groups. After the group affiliation rates of all groups reach the upper limit, the upper limit changing portion 113 according to the present embodiment changes the upper limit of the number of groups from the initial upper limit.

The additional group generating portion 114 has a function of executing a process of generating new groups by adding groups besides the plurality of groups generated by the group generating portion 111. The additional group generating portion 114 according to the present embodiment additionally generates new groups according to the change in the upper limit of the number of groups by the upper limit changing portion 113.

The game processing portion 115 has a function of executing a process related to the game. The game processing portion 115 according to the present embodiment progresses the game by giving a mission set by group unit to each player belonging to each group, with respect to each of the plurality of groups.

The calculating portion 116 has a function of executing a process of calculating various values, including a process of calculating a mission success rate with respect to entire groups. The success rate can be obtained as a ratio of the number of times of mission success of the entire groups (value obtained by summing the number of times of mission success of each group) to the number of times of mission execution of the entire groups (value obtained by summing the number of times of mission execution of each group) In the present embodiment, the calculating portion 116 calculates the mission success rate of each field at predetermined time intervals (for example, every hour) and updates game result information illustrated in FIG. 8. Also, whenever there is an access from the player terminal 20, the calculating portion 116 calculates a capacity rate of each field and updates field information illustrated in FIG. 7.

The quota changing portion 117 has a function of executing a process of changing the quota of the group. The quota changing portion 117 according to the present embodiment changes the quota of the group from an initial quota, based on the success rate calculated by the calculating portion 116.

The threshold value changing portion 118 has a function of executing a process of changing the threshold value of the group affiliation rate. The threshold value changing portion 118 according to the present embodiment changes the threshold value of the group affiliation rate from an initial threshold value, based on the success rate calculated by the calculating portion 116.

The storage unit 12 includes a read only memory (ROM) as a read only storage area where a system program is stored and a random access memory (RAM) as a rewritable storage area used as a work area of arithmetic processing by the control unit 11. The storage unit 12 is realized, for example, by a nonvolatile storage device such as a flash memory, a hard disk, or the like. The storage unit 12 of the present embodiment stores at least character information as information on characters, player information as information on players, field information as information on fields, and game result information as information on game results. Details of the information will be described later. Also, the storage unit 12 stores the initial upper limit of the number of fields (number of groups), the initial threshold value (for example, "50%") smaller than the upper limit (100%) of the capacity rate (group affiliation rate), and the initial quota of the field (for example, "100 persons").

The input unit 13 allows the system administrator to input various data (for example, character information, or the like). The input unit 13 is realized, for example, by a keyboard, a mouse, or the like.

The display unit 14 is used for displaying an operation screen for the system administrator on the basis of a command from the control unit 11, and is realized, for example, by a liquid crystal display (LCD) or the like.

The communication unit 15 is provided for performing communication between the player terminals 20. The communication unit 15 functions as a reception unit that receives various data or signals transmitted from the player terminals 20, and a transmission unit that transmits various data or signals to the player terminals 20 according to a command from the control unit 11. The communication unit 15 is realized, for example, by a network interface card (NIC), or the like.

<<Configuration of Player Terminal 20>>

Figure 3:
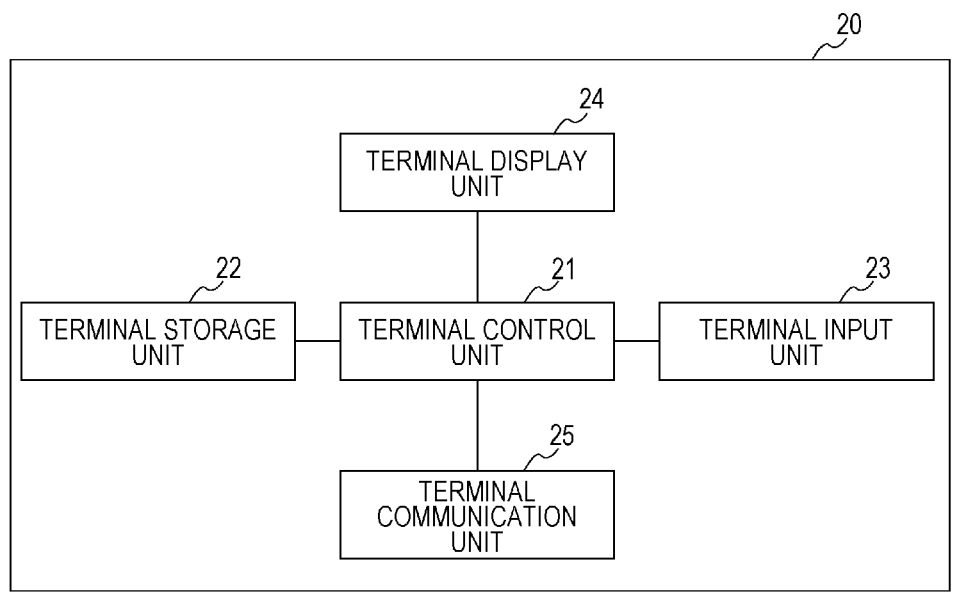
FIG. 3 is a block diagram illustrating a functional configuration of a player terminal.

FIG. 3 is a block diagram illustrating a functional configuration of the player terminal 20. The player terminal 20 of the present embodiment is an information processing device (for example, a mobile phone terminal, a smartphone, a tablet terminal, or the like) used by the player when playing the game. The player terminal 20 can request the server device 10 to deliver a variety of information on the game (game program, web page, or the like). Since the player terminal 20 has a web browser allowing the player to browse the web page, the player terminal 20 can display the web page (game screen, or the like) delivered from the server device 10. The player terminal 20 includes a terminal control unit 21, a terminal storage unit 22, a terminal input unit 23, a terminal display unit 24, and a terminal communication unit 25.

The terminal control unit 21 transfers data between the respective units and controls the entire player terminal 20. The terminal control unit 21 is realized in a manner that a central processing unit (CPU) executes a program stored in a predetermined memory. Note that the terminal control unit 21 of the present embodiment also functions as a screen display control unit that controls a display form of a game screen displayed on the terminal display unit 24. The terminal storage unit 22 is connected to the terminal control unit 21 through a bus, and performs processing of referring to, reading out, or rewriting stored data according to a command from the terminal control unit 21. The terminal storage unit 22 is realized, for example, by flash memory, a hard disk, or the like. The terminal input unit 23 allows the player to perform various operations (game operation, or the like). The terminal input unit 23 is realized, by an operation button, a touch panel, or the like. The terminal display unit 24 is used for displaying a game screen by a command from the terminal control unit 21, and is realized, for example, by a liquid crystal display (LCD) and the like. The terminal communication unit 25 functions as a transmission/reception unit for performing transmission/reception of various types of information to/from the server device 10 through the network 2, and is realized, for example, by a network interface card (NIC), or the like.

<<Data Structure>>

FIG. 4 is a diagram illustrating an example of a data structure of character information stored in the storage unit 12 of the server device 10. The character information includes fields such as a character ID, a character name, a rarity, an initial attack strength, an initial defense strength, an initial hit point, and the like. The character ID is identification information that identifies the character. The character name is information indicating a display name of the character. The rarity is a parameter indicating a rarity of the character. In the present embodiment, a 4-stage rarity ("common"→"uncommon"→"rare"→"super rare") is set. The initial attack strength, the initial defense strength, and the initial hit point of the character are parameters indicating ability values initially set to the character. Incidentally, the rarity is not limited to the 4-stage. Also, the name of each rarity may also use different names from the above name.

FIG. 5 is a diagram illustrating an example of a data structure of player information stored in the storage unit 12 of the server device 10. The player information includes fields such as a player ID, a player name, possessed character information, and the like. The player ID is identification information that identifies the player. The player name is information indicating a display name of the player. The possessed character information is information indicating a character the player possesses.

FIG. 6 is a diagram illustrating an example of a data structure of the possessed character information. The possessed character information includes fields such as a character ID, a level of a character, an attack strength, a defense strength, a hit point, an acquisition date and time, and the like. The character ID is identification information that identifies the character the player possesses. The level, the attack strength, the defense strength, and the hit point of the character are parameters indicating current capability values set to the character the player possesses. Such various parameters are updated according to the progress of the game. The acquisition date and time are information indicating a date and time when the player acquired the character.

FIG. 7 is a diagram illustrating an example of a data structure of field information stored in the storage unit 12 of the server device 10. The field information includes fields such as an index, a field name (field Fi), a maximum capacity, a capacity, a capacity rate, a player ID, and the like. The index is a serial number for designating the fields. The field name (field Fi) is information indicating a display name of the field. The maximum capacity is information indicating the quota of players, that is, information indicating the maximum number of players who can be accommodated in the field. The capacity is information indicating the number of players (number of affiliated persons) distributed to the group at this time, that is, information indicating the number of players accommodated in the field at this time. The capacity rate is an example of the group affiliation rate, and is information indicating a ratio of affiliated persons with respect to the quota of the players, that is, a ratio of the capacity with respect to the maximum capacity. The player ID is identification information that identifies the player distributed to the field.

Figures 8, 9:
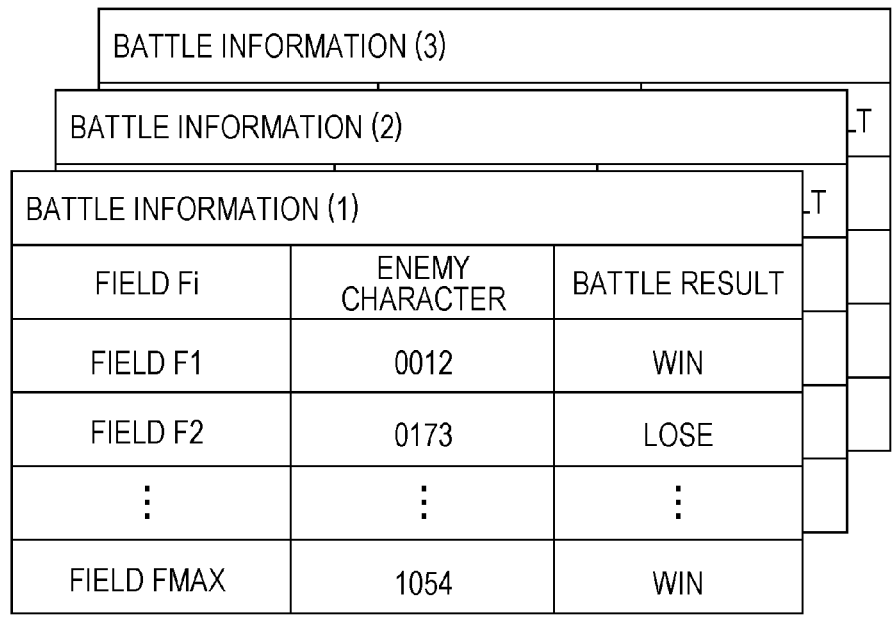
FIG. 8 is a diagram illustrating an example of a data structure of game result information.
FIG. 9 is a diagram illustrating an example of a data structure of battle information.

FIG. 8 is a diagram illustrating an example of a data structure of the game result information stored in the storage unit 12 of the server device 10. The game result information includes fields such as a data acquisition date and time, battle information, a mission success rate, and the like. The data acquisition date and time are information indicating a date and time when data was acquired. In the present embodiment, data is acquired every hour. The battle information is information on battle. The mission success rate is information indicating a ratio of the number of times of success of the entire fields (value obtained by summing the number of times of success in each field) with respect to the number of times of battle execution of the entire fields (value obtained by summing the number of times of battle execution in each field)

FIG. 9 is a diagram illustrating an example of a data structure of the battle information. The battle information is history information on the battle result in each field, and includes fields such as a field name (field Fi), an enemy character, a battle result, and the like. The field name (field Fi) is information indicating a display name of the field. The enemy character is information that identifies an enemy character appearing in the field. The battle result is victory-defeat information indicating the victory or defeat in the battle game.

<<Outline of Game>>

Here, an outline of a game provided by the game system 1 of the present embodiment will be described. The game system 1 provides various games that are executed using an electronic game card (hereinafter, referred to as "character") associated with a game character.

<Battle Game>

The game system 1 according to the present embodiment provides a battle game in which a plurality of players cooperates to perform a mission so as to defeat a common enemy.

In the battle game, a plurality of fields to be battle places is set in each field, an enemy character to be a battle opponent is set. When the player requests a participation in the battle game during the holding period of the game, the player is distributed to one of the plurality of fields. The players distributed to the same field are grouped. The mission of the players belonging to the group is to defeat the common enemy appearing in the field.

The battle against the common enemy character is performed by each player of the group. At this time, the player performs the battle against the common enemy character by using a player character selected from his or her possessed characters.

In the battle between these characters, the victory or defeat is determined by the game processing portion 115 with reference to the possessed character information illustrated in FIG. 6 and the character information illustrated in FIG. 3 and based on various parameters (attack strength, defense strength, hit point, or the like) set to the player character and various parameters (initial attack strength, initial defense strength, initial hit point, or the like) set to the common enemy character.

<Distribution of Players>

In the game system 1 according to the present embodiment, the player participating in the battle game is distributed to one of the plurality of fields.

In the following, the outline of the procedure of distributing the player will be described with reference to FIGS. 10 to 12. It is assumed herein that the quota of each field is "100 persons", the initial threshold value of the capacity rate is "50%" (the upper limit of the capacity rate is "100%"), and the initial upper limit of the number of the fields is "10".

(First Distribution Pattern)

Figure 10:
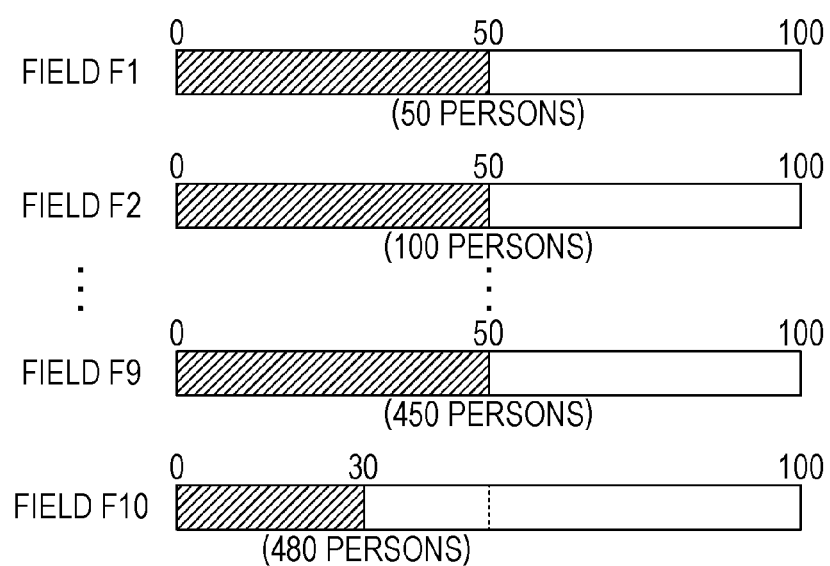
FIG. 10 is a diagram for explaining an outline of a procedure (1) when a player is distributed to a field.

FIG. 10 is a diagram for explaining the outline of the procedure of distributing the player to the field when there is an access to request a participation in the battle game from 480 players per unit time. As illustrated in FIG. 10, since the initial upper limit of the number of the fields is "10", 10 fields (field F1 to Field F10) are generated.

When there is an access to request a participation in the battle game after the start of the battle game, players are distributed to the fields in accessed order. Specifically, the first to fiftieth accessed players (50 persons) are distributed to the field F1. Then, since the capacity rate of the field F1 reaches 50% of the initial threshold value, the 51st to 100th accessed players (50 persons) are distributed to the field F2. Similarly, the 401st to 450th accessed players (50 persons) are distributed to the field F9. Then, since the capacity rate of the field F9 reaches 50% of the initial threshold value, the 451st to 480th accessed players (30 persons) are distributed to the field F10.

Therefore, when the capacity rate of all fields does not reach 50% of the initial threshold value, the procedure of distributing the accessed players to one field until the capacity rate reaches 50% of the initial threshold value is sequentially repeated from the field F1 to the field F10.

(Second Distribution Pattern)

Figure 11:
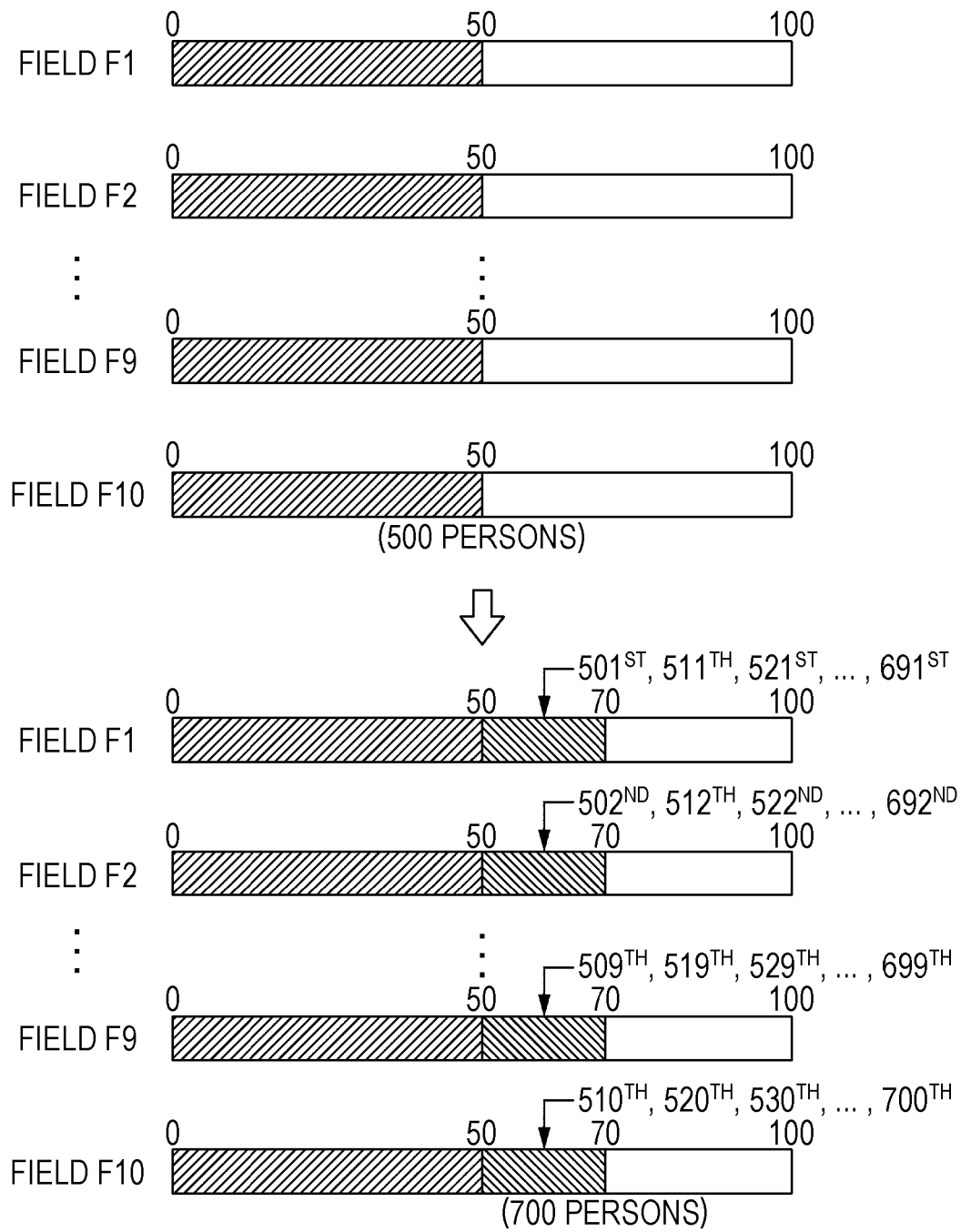
FIG. 11 is a diagram for explaining an outline of a procedure (2) when a player is distributed to a field.

FIG. 11 is a diagram for explaining the outline of the procedure of distributing the player to the field when there is an access to request a participation in the battle game from 700 players per unit time. As illustrated in the upper diagram of FIG. 11, since the initial upper limit of the number of the fields is "10", 10 fields (fields F1 to F10) are generated.

When there is an access to request a participation in the battle game during the holding period of the battle game, players are distributed to the fields in accessed order. Specifically, as illustrated in the upper diagram of FIG. 11, until the capacity rate of all fields reaches 50%, the 1st to 500th accessed players (500 persons) are sequentially distributed from the field F1 to the field F10 by the procedure similar to the first distribution pattern illustrated in FIG. 10. Then, as illustrated in the lower diagram of FIG. 11, after the capacity rate of all fields reaches 50%, the distribution is performed as follows.

That is, the 501st accessed player (1 person) is distributed to the field F1, and the 502nd accessed player (1 person) is distributed to the field F2. Similarly, the 509th accessed player (1 person) is distributed to the field F9, and the 510th accessed player (1 person) is distributed to the field F10. By repeating this procedure, 501st, 511th, 521st, . . . , 691st accessed players are distributed to the field F1. 502nd, 512th, 522nd, . . . , 692nd accessed players are distributed to the field F2. Similarly, 509th, 519th, 529th, . . . , 699th accessed players are distributed to the field F9. 510th, 520th, 530th, . . . , 700th accessed players are distributed to the field F10.

Therefore, when the capacity rate of all fields reaches 50%, which is the initial threshold value, but the capacity rate of all fields does not reach 100%, which is the upper limit, the procedure of distributing the accessed players one by one from the field F1 to field F10 is repeated until the capacity rate reaches 100%.

(Third Distribution Pattern)

Figure 12:
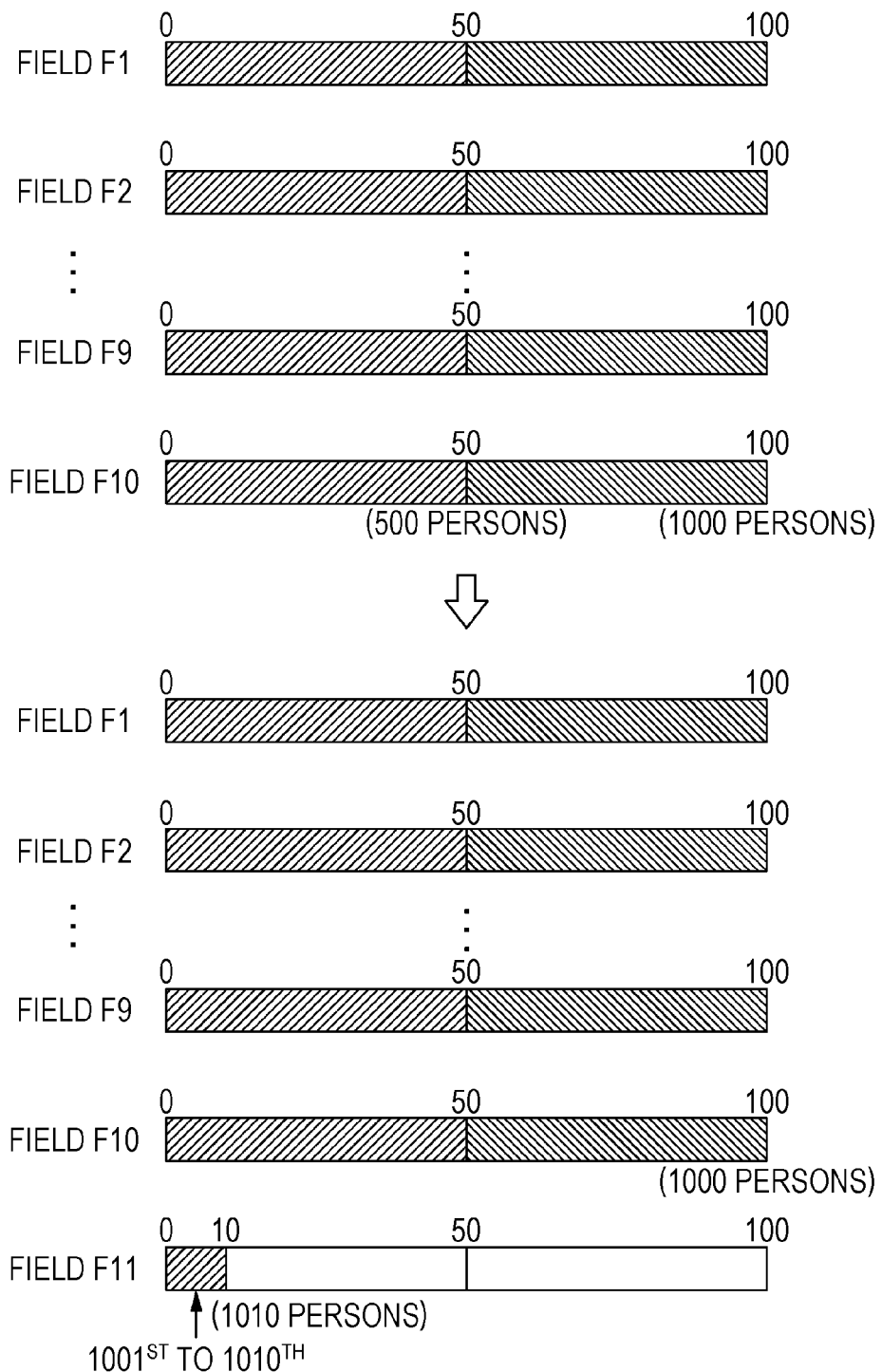
FIG. 12 is a diagram for explaining an outline of a procedure (3) when a player is distributed to a field.

FIG. 12 is a diagram for explaining the outline of the procedure of distributing the player to the field when there is an access to request a participation in the battle game from 1010 players per unit time. First, as illustrated in the upper diagram of FIG. 12, until the capacity rate of all fields reaches 50%, the 1st to 500th accessed players (500 persons) are sequentially distributed from the field F1 to the field F10 by the procedure similar to the first distribution pattern illustrated in FIG. 10. Then, until the capacity rate of all fields reaches 100%, the 501st to 1000th accessed players (1000 persons) are sequentially distributed from the field F1 to the field F10 by the procedure similar to the second distribution pattern illustrated in FIG. 11. Then, as illustrated in the lower diagram of FIG. 12, after the capacity rate of all fields reaches 100%, the distribution is performed as follows.

That is, the upper limit of the number of the fields is changed from 10, which is the initial upper limit, to 11. That is, as illustrated in the lower diagram of FIG. 12, since the initial upper limit of the number of the fields is "11", a new 11th field (field F11) is additionally generated. Then, 1001st to 1010th accessed players (10 persons) are distributed to the field F11.

In this way, after the capacity rate of all fields reached 100%, which is the upper limit, a new field F11 is additionally generated. Then, the accessed players are distributed until the capacity rate of the new field F11 reaches 50%, which is the initial threshold value.

In the past, the procedure of distributing the accessed players to one field until the capacity rate reaches 100% of the upper limit has been sequentially repeated from the field F1 to the field F10. However, if the players are distributed to the groups by such a procedure, the group reaches the quota quickly. Therefore, there is a case where the enemy character appeared in each field is attacked from the maximum number of players and is easily defeated (the difficulty level of the game is lowered).

Therefore, in the present embodiment, by setting the initial threshold value (for example, 50%) of the capacity rate with respect to each field, the number of the fields is controlled not to reach the quota quickly.

Also, if the number of persons of the group is controlled in this manner, it leads to control time taken until the group reaches the quota. For example, when it is assumed that there is an access of 10 persons in 1 minute, the following difference occurs in time until the first field F1 reaches the quota.

As in the past, in the case where the procedure of distributing the accessed players to one field until the capacity rate reaches 100% of the upper limit is sequentially repeated from the field F1 to the field F10, the field F1 reaches the quota (100 persons) in 10 minutes.

On the other hand, in the procedure of the first distribution pattern described above, if 50 persons are distributed from the field F1 to the field F10 every 5 minutes (50 minutes), and then, the players are added every 1 minute, the field F1 reaches the quota (100 persons) in 91 minutes. Therefore, since it is possible to delay the time necessary until the first field F1 reaches the quota, it is possible to make it hard to defeat the enemy character (the difficulty level of the game is raised).

<<Operation of Game System 1>>

Figure 13:
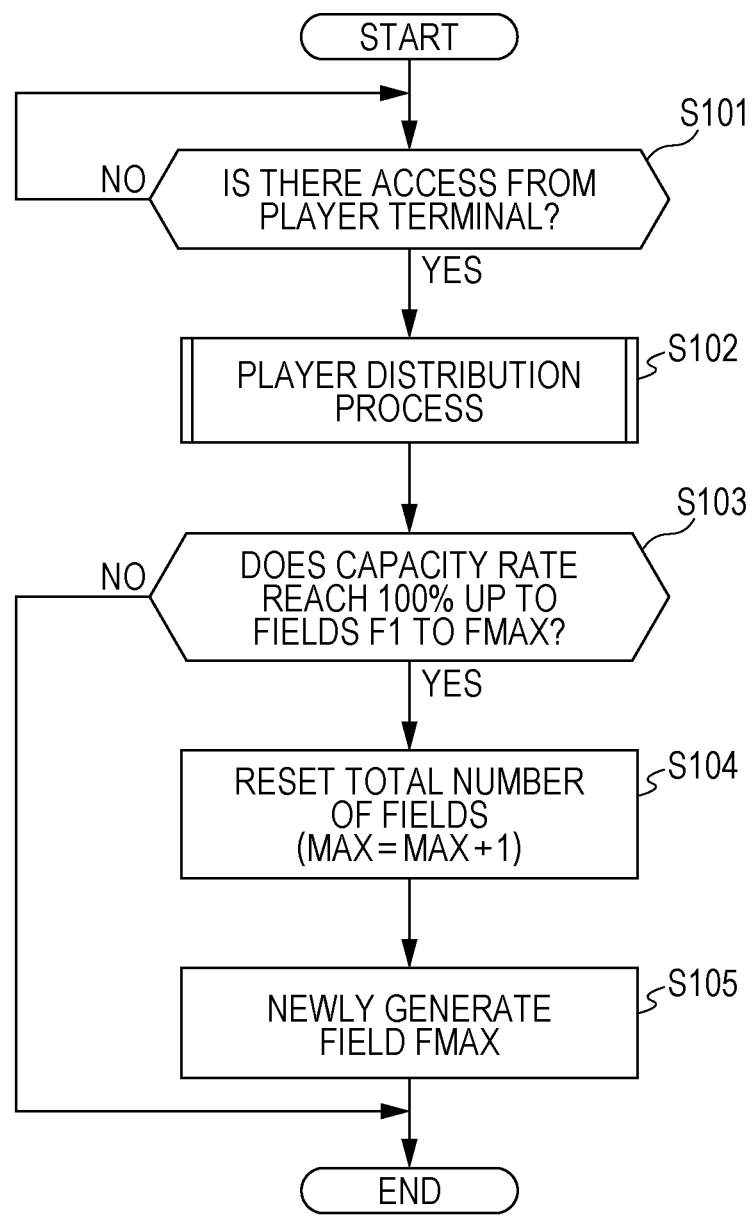
FIG. 13 is a flowchart for explaining an example of operation of the game system.

FIG. 13 is a flowchart for explaining an example of operation of the game system 1 according to the present embodiment. It is assumed herein that the quota of the field Fi is "100 persons", the initial threshold value of the capacity rate (group affiliation rate) is "50%" (the upper limit of the capacity rate is "100%"), and the initial upper limit of the number of fields is "10".

First, after the start of the battle game, the server device 10 determines whether there is an access (request for participation in the field) from the player terminal 20 (S101). When there is the access (S101: YES), the server device 10 proceeds to step S102.

Subsequently, when receiving the access (request for participation in the field) from the player terminal 20, the server device 10 performs the player distribution process (S102). That is, the player distributing portion 112 distributes the player accessed using the player terminal 20 to one of 10 fields (groups) generated by the group generating portion 111 based on the initial upper limit of the number of the groups.

FIG. 14 is a flowchart for explaining the player distribution process.

First, the initial setting (i=0) of the index i is performed (S201). The index i corresponds to the field name (field Fi). In the present embodiment, since the initial upper limit of the number of the fields is "10", fields F1 to F10 are generated at the start of the game, and the maximum value (MAX) of the index i is reset to "10".

Subsequently, the index i is incremented by 1 (i=i+1) (S202), whether the field Fi has been disappeared is determined by the player distributing portion 112 (S203). The disappearance of the field Fi is to perform the setting to delete the field Fi due to the elapse of a predetermined time (for example, 1 hour) from the generation of the field Fi by the group generating portion 111 or to perform the setting to delete the field Fi by clearing the mission by defeating the enemy character appeared in the field Fi. At this time, each of the grouped players is ungrouped.

Then, when it is determined that the field Fi has not been disappeared (S203: NO), the process proceeds to step S204. On the other hand, when it is determined that the field Fi has been disappeared (S203: YES), the process returns to step S202 to increment the index i by 1, and the subsequent processes are repeated.

Subsequently, in step S204, whether the capacity rate of the field Fi has reached 50% is determined by the player distributing portion 112. For example, when the index i is 1, whether the capacity rate of the first field Fi has reached 50% is determined.

Then, when it is determined that the capacity rate of the field Fi has not reached 50% (S204: NO), the player accessed using the player terminal 20 is distributed to the field Fi (S205). On the other hand, when it is determined that the capacity rate of the field F has reached 50% (S204: YES), the process proceeds to step S206.

Subsequently, in step S206, whether the index i is matched with the maximum value (MAX=10) is determined. When matched (S206: YES), the capacity rate of all fields has reached 50% (see the upper drawing of FIG. 11). The players accessed using the player terminals 20 are sequentially distributed one by one from the field F1 to the field F10 (S207, see the lower drawing of FIG. 11). On the other hand, when not matched (S206: NO), the field where the capacity rate of the field has not reached 50% is still left. Therefore, the process returns to step S202 to increment the index i by 1, and the subsequent processes are repeated (see FIG. 10).

Referring back to FIG. 13, when the player distribution process is performed in this manner, the server device 10 determines whether the capacity rate of the field F1 to the field Fmax (herein, field Fmax=field F10) has reached 100% (S103). When it is determined that the capacity rate of the field F1 to the field Fmax has not reached 100% (S103: NO), the process is ended. On the other hand, when it is determined that the capacity rate of the field F1 to the field Fmax has reached 100% (S103: YES), the total number of the fields is reset (S104). That is, the upper limit changing portion 113 changes the upper limit of the number of the fields from the initial upper limit "10" to "11" (MAX=MAX+1) and updates the record of the storage unit 12.

Subsequently, the server device 10 newly generates the field Fmax (S105). That is, the additional group generating portion 114 additionally generates new field Fmax (herein, field Fmax=field F11) according to the change in the upper limit of the number of the fields by the upper limit changing portion 113 (see the lower diagram of FIG. 12).

<Threshold Value of Capacity Rate>

When new field F11 is added and generated, the server device 10 sets the threshold value of the capacity rate with respect to the field F11. In the present embodiment, the threshold value of the capacity rate is set based on the mission success rate in all fields.

For example, when the mission success rate is raised, the threshold value of the capacity rate of the new field F11 is set to be lower than the initial threshold value (50%). Conversely, when the mission success rate is lowered, the threshold value of the capacity rate of the new field F11 is set to be higher than the initial threshold value (50%). That is, as the trend until the field added this time is, when the enemy character tends to be easily defeated, the subsequent difficulty level of the game is raised by performing control to reduce the number of persons of the field. Conversely, when the enemy character tends to be hardly defeated, the subsequent difficulty level of the game is lowered by performing control to increase the number of persons of the field.

Specifically, the calculating portion 116 of the server device 10 acquires the mission result of each field every hour, calculates the mission success rate of all fields, and updates the game result information illustrated in FIG. 8. That is, the calculating portion 116 calculates the number of mission executions in all fields from the sum of the number of mission executions (number of battle with the enemy character) in the respective fields F1 to F10. Then, the calculating portion 116 calculates the number of mission successes in all fields from the sum of the number of mission successes (number of successes in the battle with the enemy character) in the respective fields F1 to F10. Then, the calculating portion 116 calculates the ratio of the number of mission successes in all fields with respect to the number of mission executions in all fields, and determines the mission success rate of all fields.

Subsequently, the threshold value changing portion 118 of the server device 10 acquires the mission success rate of the data acquisition date and time closest to the date and time when the new field F11 is added and generated, with reference to the game result information illustrated in FIG. 8. Then, the threshold value changing portion 118 determines whether the acquired mission success rate is higher than a reference value (for example, 70% to 75%), and updates the record of the storage unit 12 by changing the threshold value of the capacity rate of the added and generated field F11, based on the determination result. Specifically, when the determination result shows that the mission success rate is higher than the reference value (in a state where the difficulty level of the game is lowered), the threshold value changing portion 118 sets the threshold value of the capacity rate of the new field F11 to be lower than the initial threshold value (50%). When the mission success rate is lower than the reference value (in a state where the difficulty level of the game is raised), the threshold value changing portion 118 sets the threshold value of the capacity rate of the new field F11 to be higher than the initial threshold value (50%). Also, when the mission success rate is the reference value, the threshold value of the capacity rate of the new field F11 is set to the initial threshold value (50%).

As described above, in the game system 1 according to the present embodiment, when there is an access from a player wanting to participate in the battle game at an arbitrary timing after the start of the battle game, the accessed player is distributed to one of the plurality of fields for playing the battle game. Since the initial threshold value (for example, 50%) of the capacity rate is set in each field, the number of persons of the group is controlled such that the field does not reach the quota quickly. Then, when each field reaches the quota, the new field is added and generated. The threshold value of the capacity rate determined based on the mission success rate of all fields is set to the new field. Therefore, the difficulty level of the game in each field can be adjusted with good balance because the number of persons of each field is appropriately controlled according to the battle situation, such as whether the enemy character tends to be easily defeated or tends to be hardly defeated.

Other Embodiments

The above-described embodiment has been given for easy understanding of the present invention, and is not to construe the present invention in a limited manner. The present invention can be modified and improved without departing from the gist of the invention and includes its equivalents. In particular, embodiments described below are also included in the present invention.

<Quota of Field>

In the present embodiment, when the new field Fmax (field F11) is added and generated, the quota of the new field Fmax may be changed from the initial quota, based on the mission success rate of all fields. For example, the quota changing portion 117 acquires the mission success rate of the data acquisition date and time closest to the date and time when the new field F11 is added and generated, with reference to the game result information illustrated in FIG. 8. Then, the quota changing portion 117 may determine whether the acquired mission success rate is higher than a reference value (for example, 70% to 75%), and update the record of the storage unit 12 by changing the quota of the added and generated field F11 from the initial quota (for example, "100 persons"), based on the determination result. Specifically, when the determination result shows that the mission success rate is higher than the reference value, the quota changing portion 117 sets the quota of the new field F11 to be lower than the initial quota (100 persons). When the mission success rate is lower than the reference value, the quota of the new field F11 is set to be higher than the initial quota (100 persons). Also, when the mission success rate is the reference value, the quota of the new field F11 is set to the initial quota (100 persons).

<Difficulty Level of Battle Game>

In the present embodiment, the difficulty level of the mission set by group units may be changed based on the mission success rate of all groups. For example, the game processing portion 115 may change the strength (ability parameter such as attack strength or the like) of the enemy character appearing in each field, based on the mission success rate of all fields calculated by the calculating portion 116. That is, when the mission success rate is raised, the ability parameter of the enemy character may be raised (the enemy character may be strengthened). Conversely, when the mission success rate is lowered, the ability parameter of the enemy character may be lowered (the enemy character may be weakened).

<Server Device>

In the above-described present embodiments, the game system 1 provided with one server device 10 as an example of a server device has been exemplarily described. However, the game system 1 is not limited to this example, and may be provided with a plurality of server devices 10 as an example of the server device. Specifically, a plurality of server devices 10 may be connected through a network 2, and each of the server devices 10 may perform various types of processing in a distributed manner. Also, the server device 10 is an example of a computer provided with a processor and a memory.

<Information Processing Apparatus>

In the game system 1 according to the present embodiment, the case where a variety of information processing is performed by the cooperation of the server device 10 and the player terminal 20 according to the game program has been described as an example, but the present invention is not limited thereto. As the information processing apparatus, the player terminal 20 alone or the server device 10 alone may execute a variety of above-described processing according to the game program.

Also, the player terminal 20 may be configured to manage a part of the functions as the information processing apparatus. In this case, the server device 10 and the player terminal 20 constitute the information processing apparatus.

Also, the information processing apparatus is an example of a computer provided with a processor and a memory.

What is claimed is:

1. A server device that is connected to a plurality of player terminals through a network to facilitate a cooperative battle game, the server device comprising:
    a memory configured to store an initial upper limit of number of groups and an initial threshold value smaller than an upper limit of a group affiliation rate, wherein the group affiliation rate is a ratio of number of affiliated persons with respect to a quota of a group; and
    a processor, configured to:
    generate a plurality of groups;
    at a start of the cooperative battle game, set, for the plurality of groups, the group affiliation rate to the initial threshold value based on the initial upper limit of the number of groups;
    when there is a request for participation in a first group from the player terminal after the start of the cooperative battle game, distribute players using the player terminals to groups where the group affiliation rate has not reach the initial threshold value;
    after the group affiliation rate of all groups has reached the initial threshold value, distribute the players using the player terminals to groups where the group affiliation rate has not reached the upper limit;
    progress the cooperative battle game that gives missions set by the processor to each player belonging to each group in each of the plurality of groups, each of the missions set to each player indicative of one or more common enemy characters to be defeated by one or more player characters possessed by the each player belonging to the each group in the each of the plurality of groups;
    calculate a mission success rate for all of the groups;
    change the threshold value of the group affiliation rate from the initial threshold value to a second threshold value, based on the calculated mission success rate; and
    generate a second group having the group affiliation rate set to the second threshold value.

2. The server device according to claim 1, wherein the processor is configured to:
    change the upper limit of the number of the groups from the initial upper limit after the group affiliation rate of all groups has reached the upper limit; and
    generate a third group, based on the changed upper limit of the number of the groups,
    wherein after the group affiliation rate of all groups has reached the upper limit, the processor is configured to distribute the players using the player terminals to the third group.

3. The server device according to claim 2,
    wherein the memory stores an initial quota of the first group, and wherein the processor is configured to:
    change the initial quota of the first group from the initial quota to a second quota, based on the calculated success rate; and
    generate a fourth group having the second quota.

4. The server device according to claim 1,
wherein the processor is configured to change a difficulty level of the missions set by the processor, based on the calculated mission success rate.

5. A non-transitory computer-readable storage medium storing game program causing a server device, which is connected to a plurality of player terminals through a network to facilitate a cooperative bathe game, to execute:
storing an initial upper limit of number of groups and an initial threshold value smaller than an upper limit of a group affiliation rate, wherein the group affiliation rate is a ratio of number of affiliated persons with respect to a quota of a group;
generating a plurality of groups;
at a start of the cooperative battle game, set, for the plurality of groups, the group affiliation rate to the initial threshold value based on the initial upper limit of the number of groups;
when there is a request or participation in a group from the player terminal after the start of the cooperative battle game, distributing players using the player terminals to groups where the group affiliation rate has not reach the initial threshold value;
after the group affiliation rate of all groups has reached the initial threshold value, distributing players using the player terminals to groups where the group affiliation rate has not reached the upper limit;
progressing the cooperative bathe game that gives Missions set to each player belonging to each group in each of the plurality of groups, each of the missions set to each player indicative of one or more common enemy characters to be defeated by one or more player characters possessed by the each player belonging to the each group in the each of the plurality of groups;
calculating a mission success rate for all of the groups;
changing the threshold value of the group affiliation, rate from the initial threshold value, based on the calculated mission success rate; and
generating a new group having the group affiliation rate set to the changed threshold value.

* * * * *